(12) United States Patent
Nishihara et al.

(10) Patent No.: US 10,665,880 B2
(45) Date of Patent: May 26, 2020

(54) CELL, CELL STACK DEVICE, MODULE AND MODULE-CONTAINING DEVICE

(71) Applicant: KYOCERA Corporation, Kyoto-shi, Kyoto (JP)

(72) Inventors: Masato Nishihara, Kirishima (JP); Masashi Kawakami, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 398 days.

(21) Appl. No.: 14/913,218

(22) PCT Filed: Aug. 30, 2014

(86) PCT No.: PCT/JP2014/072842
§ 371 (c)(1),
(2) Date: Feb. 19, 2016

(87) PCT Pub. No.: WO2015/030215
PCT Pub. Date: Mar. 5, 2015

(65) Prior Publication Data
US 2016/0211542 A1  Jul. 21, 2016

(30) Foreign Application Priority Data

Aug. 31, 2013  (JP) .................................. 2013-180784
Aug. 31, 2013  (JP) .................................. 2013-180785

(51) Int. Cl.
*H01M 8/1286*  (2016.01)
*H01M 8/1226*  (2016.01)
*H01M 8/1213*  (2016.01)
*H01M 8/0217*  (2016.01)
*H01M 8/1231*  (2016.01)
(Continued)

(52) U.S. Cl.
CPC ....... *H01M 8/1286* (2013.01); *H01M 8/0219* (2013.01); *H01M 8/1213* (2013.01); *H01M 8/1226* (2013.01); *H01M 8/1231* (2016.02); *H01M 8/2428* (2016.02);
(Continued)

(58) Field of Classification Search
CPC ............ H01M 8/1286; H01M 8/1226; H01M 8/1231; H01M 8/2428; H01M 8/2457; H01M 8/0219; H01M 2008/1293; H01M 2300/0074
See application file for complete search history.

(56) References Cited

U.S. PATENT DOCUMENTS

2011/0198216 A1* 8/2011 Larsen ................ H01M 4/8663
204/242

FOREIGN PATENT DOCUMENTS

JP  H07-296839 A  11/1995
JP  2004-253279 A  9/2004
(Continued)

OTHER PUBLICATIONS

Machine Translation: JP 2008-084716.*
(Continued)

*Primary Examiner* — Stephen J Yanchuk
(74) *Attorney, Agent, or Firm* — Procopio Cory Hargreaves and Savitch LLP

(57) ABSTRACT

A cell of the present invention is obtained by locating a first electrode layer on a porous supporting body, a solid electrolyte layer that is formed of a ceramic on the first electrode layer, and a second electrode layer on the solid electrolyte layer, wherein an amount of Na in the supporting body is $30 \times 10^{-6}$ mass % or less.

12 Claims, 11 Drawing Sheets

(51) Int. Cl.
H01M 8/2428 (2016.01)
H01M 8/2457 (2016.01)
H01M 8/124 (2016.01)

(52) U.S. Cl.
CPC .. *H01M 8/2457* (2016.02); *H01M 2008/1293* (2013.01); *H01M 2300/0074* (2013.01)

(56) References Cited

FOREIGN PATENT DOCUMENTS

| | | |
|---|---|---|
| JP | 2008-084716 A | 4/2008 |
| JP | 2011-204505 A | 10/2011 |
| JP | 2011-238629 A | 11/2011 |

OTHER PUBLICATIONS

Liu et al (Effects of impurities on microstructure in Ni/YSZ-YSZ half-cells of SOFC. Solid State Iconics 161. 2003. p. 1-10.*

Extended European Search Report dated Jan. 10, 2017, issued by the European Patent Office in counterpart European Patent Application No. 14840086.4.

International Search Report (Form PCT/ISA/210) dated Sep. 30, 2014, issued for International Patent Application No. PCT/JP2014/072842.

* cited by examiner

CELL, CELL STACK DEVICE, MODULE AND MODULE-CONTAINING DEVICE

TECHNICAL FIELD

The present invention relates to a cell, a cell stack device, a module and a module-containing device.

BACKGROUND ART

In recent years, as a source of next-generation energy, various fuel cell devices have been proposed in which a cell stack device formed by electrically connecting a plurality of solid oxide fuel cells (hereinafter, may be abbreviated to fuel cell) in series is housed in a housing container.

The fuel cells of such fuel cell devices are provided with a conductive supporting body containing Ni and this conductive supporting body has a pair of main surfaces parallel to each other and a fuel gas passage for circulating fuel gas therein. Then, a fuel cell formed by laminating a fuel electrode layer, a solid electrolyte layer, and an oxygen electrode layer in order on the first main surface of the conductive supporting body and laminating an interconnector layer on the second main surface has been proposed (for example, refer to Patent Literature 1).

The fuel cell of Patent Literature 1 is configured by bonding both ends of a solid electrolyte layer, which is formed of a dense zirconia, formed so as to surround the periphery of a hollow, plate-shaped conductive supporting body, with both ends of an interconnector layer formed of dense lanthanum chromite.

That is, the fuel cell of Patent Literature 1 is configured such that the periphery of the conductive supporting body is hermetically surrounded by the solid electrolyte layer and the interconnector layer and the fuel gas which passes through the interior of the conductive supporting body does not leak out to the outside from the dense tubular body formed by the solid electrolyte layer and the interconnector layer.

In order to prevent cracks in such a dense tubular body, a fuel cell with a so-called dumbbell shape where both ends in the width direction of the fuel cell are bulged in the thickness direction is known in the conventional art (for example, refer to Patent Literature 2).

Patent Literature 2 discloses a fuel cell with a shape where each side in the width direction of a flat section are bulged in the thickness direction, in which, when the thicknesses of the conductive supporting body, the inner electrode layer, and the solid electrolyte layer corresponding to the flat section are respectively L1, M1, and N1 and the thicknesses of the conductive supporting body, the inner electrode layer, and the solid electrolyte layer corresponding to the ends are respectively L2, M2, and N2, a relationship of $1.01 \leq (L2+M2+N2)/(L1+M1+N1) \leq 1.3$ is satisfied.

CITATION LIST

Patent Literature

Patent Literature 1: Japanese Unexamined Patent Application Publication No. 2008-84716A
Patent Literature 2: Japanese Unexamined Patent Application Publication No. 2011-204505A

SUMMARY OF INVENTION

Technical Problem

However, the strength of the porous supporting body is low in the fuel cells described in Patent Literature 1 and 2 in the conventional art, thus it is necessary to reduce the open porosity of the supporting body in order to increase the strength thereof. To do so, it is necessary to increase the firing temperature when manufacturing the fuel cell; however, when the firing temperature is increased, there is a problem in that the amount of deformation during reduction of the fuel cell is increased.

An object of the present invention is to provide a cell in which a supporting body is able to have a small open porosity even in cases where the firing temperature is low; a cell stack device; a module; and a module-containing device.

Solution to Problem

A cell of the present invention is obtained by locating a first electrode layer on a porous supporting body, a solid electrolyte layer that is formed of a ceramic on the first electrode layer, and a second electrode layer on the solid electrolyte layer, wherein an amount of Na in the supporting body is $30 \times 10^{-6}$ mass % or less.

In addition, a cell of the present invention is obtained by locating a solid electrolyte layer that is formed of a ceramic on a porous supporting body that serves as a first electrode layer and a second electrode layer on the solid electrolyte layer, wherein an amount of Na in the supporting body is $30 \times 10^{-6}$ mass % or less.

A cell stack device of the present invention is provided with a plurality of the cells described above, the plurality of cells being electrically connected.

A module of the present invention is a module wherein the cell stack device described above is housed in a housing container.

A module-containing device of the present invention is a module-containing device in which the module described above and an auxiliary device for operating the module are housed in an external case.

Advantageous Effects of Invention

Since the amount of Na is $30 \times 10^{-6}$ mass % or less in the cell of the present invention, the open porosity can be decreased even in a case where the firing temperature is low and the strength of the supporting body can be increased and the generation of cracks in the cell reduced. By using such a cell, the long-term reliability can be improved in the cell stack device, the module, and the module-containing device.

BRIEF DESCRIPTION OF DRAWINGS

FIG. 1A is a cross-sectional view and FIG. 1B is a side surface view of FIG. 1A seen from an oxygen electrode layer side.

FIG. 5A is a perspective view and FIG. 5B is a side surface view of FIG. 5A seen from the oxygen electrode layer side.

FIG. 7A is a side surface view schematically illustrating the cell stack device, and FIG. 7B is a cross-sectional view illustrating enlarged parts of the portions surrounded by broken lines in the cell stack device in FIG. 7A.

DESCRIPTION OF EMBODIMENTS

Figure 1A:
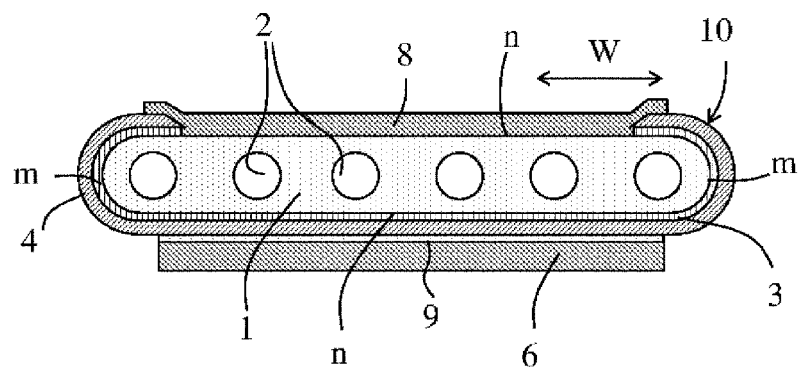
FIGS. 1A and 1B illustrate a first embodiment of a fuel cell.
Figure 1B:
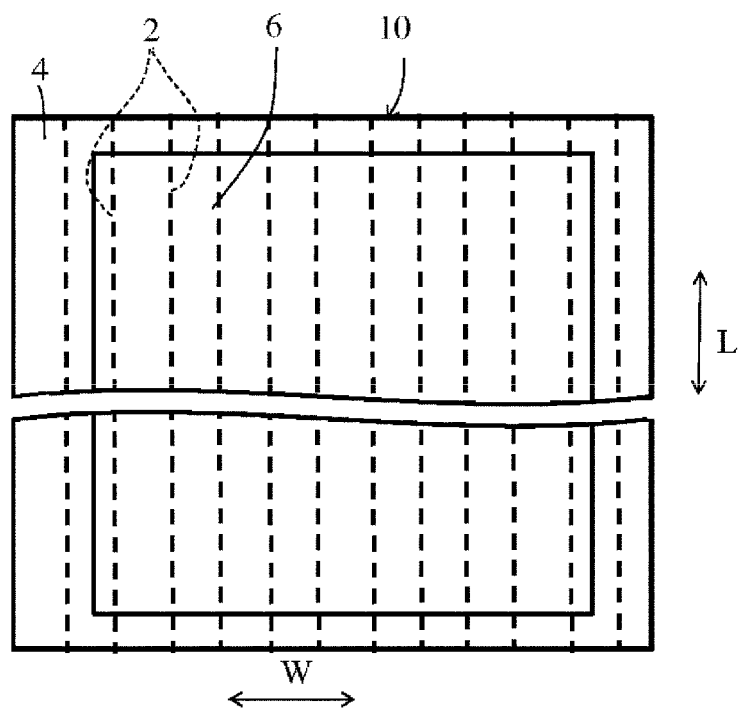

FIGS. 1A and 1B illustrate a first embodiment of a solid oxide fuel cell which is an example of a cell, FIG. 1A is a cross-sectional view thereof, and FIG. 1B is a side surface view of FIG. 1A. Here, both diagrams illustrate enlarged parts of each configuration of a fuel cell 10. FIGS. 4 to 10 also illustrate enlarged parts in a similar manner.

This fuel cell 10 is a hollow plate type fuel cell and is provided with a porous conductive supporting body 1 with an elongated plate shape formed to contain at least one of Ni and NiO. In the interior of the supporting body 1, a plurality of fuel gas flow paths 2 are formed at appropriate intervals to pass therethrough in the longitudinal direction L of the supporting body 1 and the fuel cell 10 has a structure in which various members are provided on the supporting body 1.

The supporting body 1 has a plate shape configured by a pair of main surfaces n which are substantially parallel to each other and arcuate surfaces (side surfaces) m which connect each of the main surfaces n as can be understood from the shapes illustrated in FIGS. 1A and 1B. Here, a porous fuel electrode layer (first electrode layer) 3 is arranged so as to cover the first main surfaces n (the main surface of one side: the lower surface) and the arcuate surfaces m on both sides thereof, and a solid electrolyte layer 4 formed of a dense ceramic having a gas barrier property is also arranged so as to cover the fuel electrode layer 3. The thickness of the solid electrolyte layer 4 is desirably 40 μm or less, 20 μm or less, and 15 μm or less from the point of view of improving the power generation performance.

In addition, a porous oxygen electrode layer (a second electrode layer) 6 is arranged on the surface of the solid electrolyte layer 4 on the first main surface n so as to face the fuel electrode layer 3 via an intermediate layer 9. The intermediate layer 9 is formed on the solid electrolyte layer 4 on which the oxygen electrode layer 6 is formed.

A dense interconnector layer 8 formed of lanthanum chromite-based ($LaCrO_3$ based) oxide having a gas barrier property is formed via a cohesion layer, which is not illustrated, on the second main surface n (the main surface of other side: the upper surface) on which the solid electrolyte layer 4 is not laminated.

That is, the fuel electrode layer 3 and the solid electrolyte layer 4 are formed from the first main surface n, around the arcuate surfaces m at both ends, and up to the second main surface n, and both ends of the interconnector layer 8 are laminated to be bonded with both ends of the solid electrolyte layer 4.

In other words, the supporting body 1 is surrounded by the dense solid electrolyte layer 4 having a gas barrier property and the interconnector layer 8 and is configured such that the fuel gas flowing through the interior thereof does not leak out. In other words, the solid electrolyte layer 4 and the interconnector layer 8 form a tubular body having a gas barrier property, the interior of the tubular body is set as a fuel gas flow path, and the fuel gas supplied to the fuel electrode layer 3 and the oxygen-containing gas supplied to the oxygen electrode layer 6 are interrupted by the tubular body.

To be more specific, as illustrated in FIG. 1B, the oxygen electrode layer 6 of which the planar shape is a rectangular shape is not formed at the upper and lower ends of the supporting body 1, while the interconnector layer 8, although not illustrated, is formed from the upper end in the longitudinal direction L of the supporting body 1 to the lower end. Both ends of the supporting body 1 in the width direction W are bonded with the surfaces of both ends of the solid electrolyte layer 4.

In the fuel cell 10, the portion where the fuel electrode layer 3 and the oxygen electrode layer 6 face each other via the solid electrolyte layer 4 functions as a fuel cell to generate power. That is, oxygen-containing gas such as air flows to the outside of the oxygen electrode layer 6 and the fuel gas (hydrogen-containing gas) flows in fuel gas flow paths 2 in the supporting body 1 and the gases are heated up to a predetermined operating temperature to generate power. Then, the current generated by the power generation is collected via the interconnector layer 8 provided on the supporting body 1.

Then, in the first embodiment, the amount of Na of the supporting body 1 is set to $30 \times 10^{-6}$ mass % or less. In particular, the amount of Na is set to $25 \times 10^{-6}$ mass % or less or $20 \times 10^{-6}$ mass % or less. Na is inevitably contained in the supporting body 1. A reduction in the amount of Na in the supporting body 1 can be achieved by using organic resins (organic binders, solvents, and the like) and raw material powders with a low Na content as the molded body of the supporting body 1 and reducing the amount of Na in the supporting body molded body. Since the amount of Na in the supporting body 1 is $30 \times 10^{-6}$ mass % or less in this manner, the open porosity can be decreased even in a case where the firing temperature is low and the strength of the fuel cell can be increased and the generation of cracks reduced. Here, the amount of Na in the supporting body 1 can be measured by the atomic absorption spectroscopy.

Figure 2A:
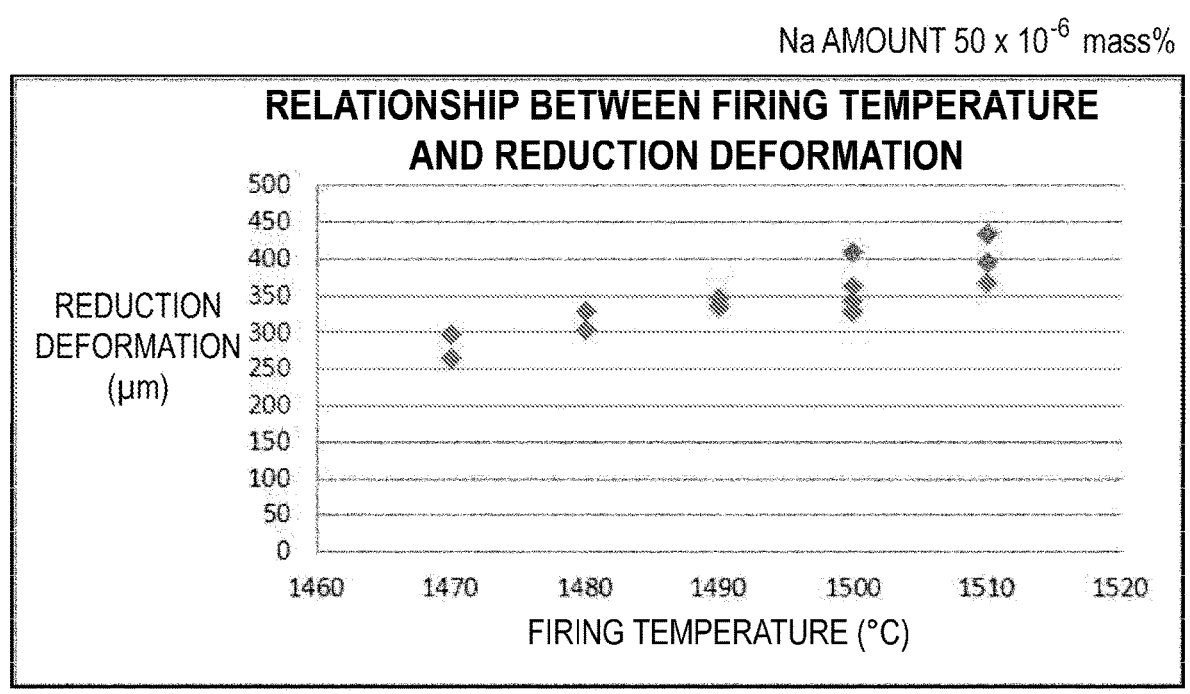
FIG. 2A is a graph showing a relationship between a firing temperature and a reduction deformation amount and FIG. 2B is a graph showing a relationship between a firing temperature and an open porosity, in cases where the amount of Na in the supporting body is $50 \times 10^{-6}$ mass %.
Figure 2B:
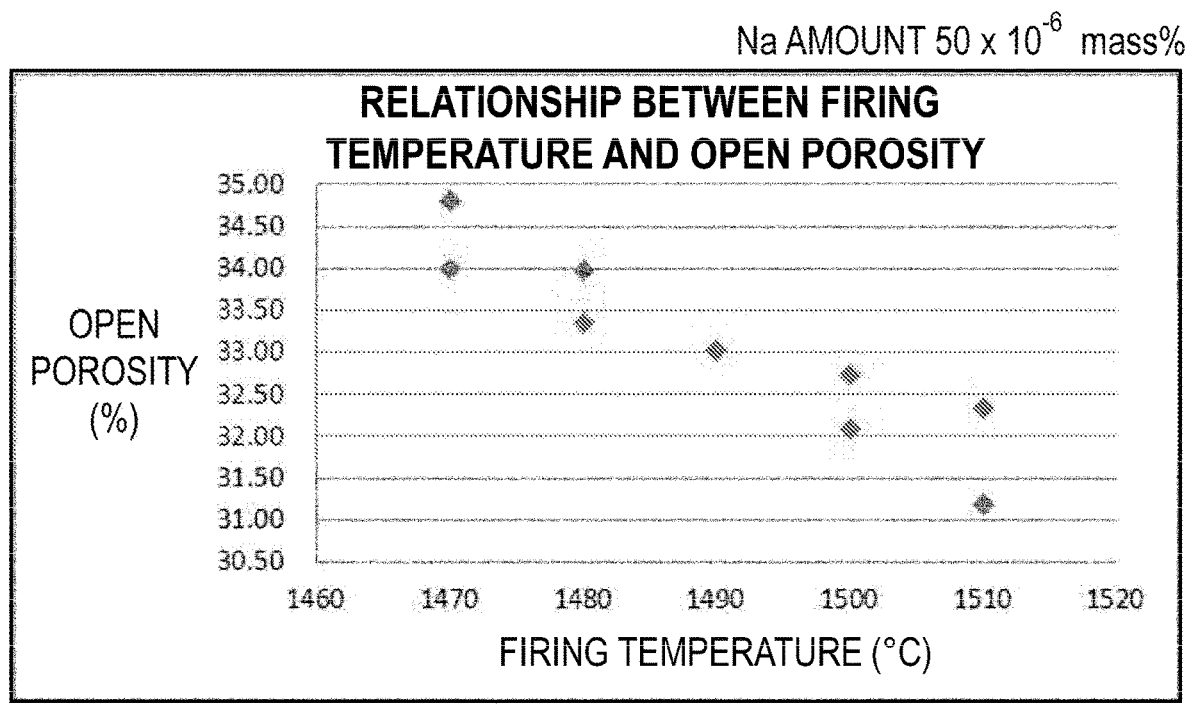

That is, no relationship was found in the conventional art between the amount of Na in the supporting body 1 and the open porosity and, as a result, the amount of Na in supporting bodies is normally $50 \times 10^{-6}$ mass % or more and it is understood that, in such a case, the higher the firing temperature for sufficiently sintering the solid electrolyte layer to increase the density, the greater the amount of deformation when the fuel cell manufactured by sintering is exposed to a reduction atmosphere of 850° C. as illustrated in FIG. 2A, while the open porosity in the supporting body 1 increases as the firing temperature is lowered as illustrated in FIG. 2B. Accordingly, it is necessary to lower the firing temperature to reduce the reduction deformation of the fuel cell; however, in this case, it is understood that the open porosity of the porous supporting body 1 is increased and the strength of the fuel cell is decreased.

Here, FIG. 2A illustrates the deformation amount when fuel cells manufactured by firing at the firing temperatures on the horizontal axis are exposed to a reduction atmosphere of 850° C. After the fuel cells were exposed to a reduction atmosphere (a hydrogen atmosphere) of 850° C., the dimensions upon returning to room temperature (20° C.) were measured and the reduction deformation amount was set as the difference between the measured dimensions and the dimensions at the normal atmosphere room temperature (20° C.) before the reduction process. Here, the firing temperature is the maximum temperature when manufacturing the fuel cell. In addition, the graphs of FIGS. 2A and 2B include portions where the reduction deformation amount and the open porosity are measured and plotted with respect to the firing temperature for a plurality of the fuel cells.

Figure 3:
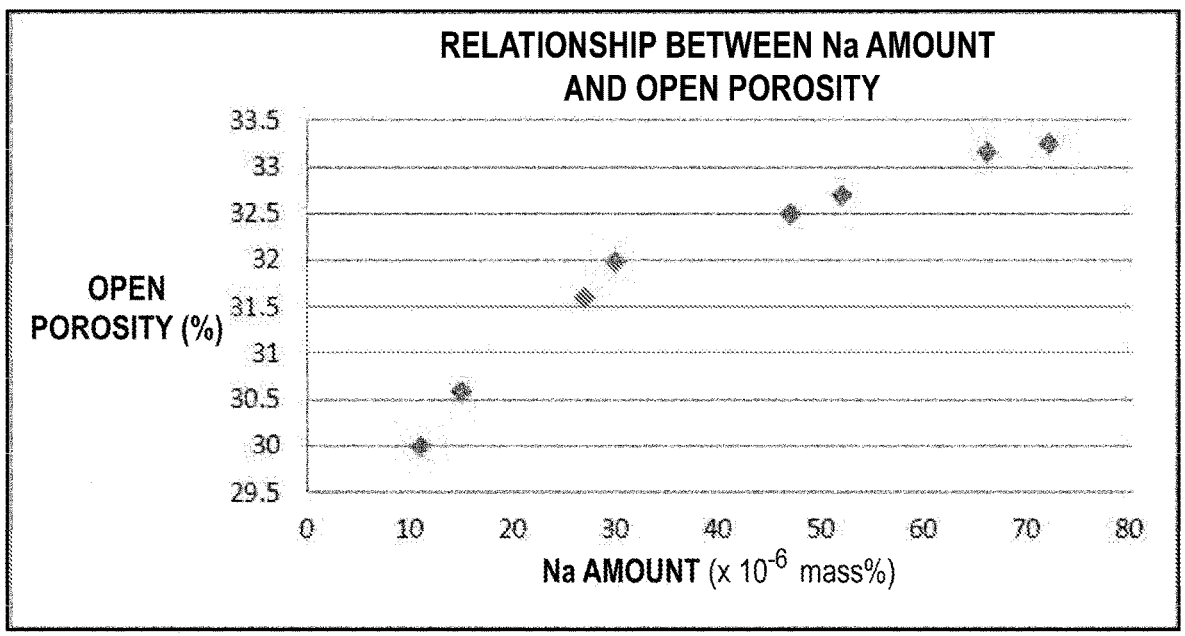
FIG. 3 is a graph showing a relationship between the amount of Na in a supporting body and the open porosity at a firing temperature of 1500° C.

FIG. 3 shows the open porosity of the supporting body 1 in cases where the firing temperature of the fuel cell was set to 1500° C. and the amount of Na in the supporting body 1 was changed and it is understood that the open porosity can be reduced by reducing the amount of Na. Accordingly, it is understood that, even in a case where the firing temperature is lowered, the open porosity can be reduced and the strength of the supporting body 1 increased by reducing the amount of Na. The open porosity can be measured using the Archimedes method by cutting out a part of the supporting body 1 in the fuel cell.

Figure 4:
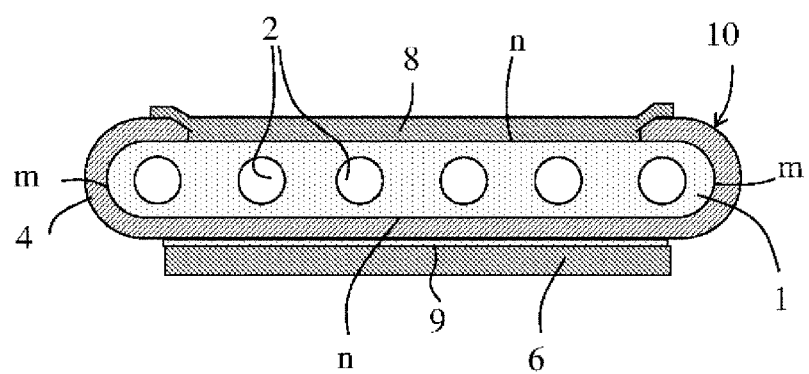
FIG. 4 is a cross-sectional view illustrating a second embodiment of a fuel cell in which a fuel electrode layer is the supporting body.

Here, FIG. 4 is a cross-sectional view illustrating a second embodiment of the fuel cell in which the fuel electrode layer is the supporting body; however, even in such a case, the same effects as in FIGS. 1A and 1B can be obtained. That is, in the first embodiment illustrated in FIGS. 1A and 1B, the fuel electrode layer 3, the solid electrolyte layer 4, and the oxygen electrode layer 6 are laminated on the supporting body 1; however, as in the second embodiment in FIG. 4, the fuel electrode layer itself may be set as the supporting body 1 and the solid electrolyte layer 4 and the oxygen electrode layer 6 may be provided on this supporting body 1.

Figure 5A:
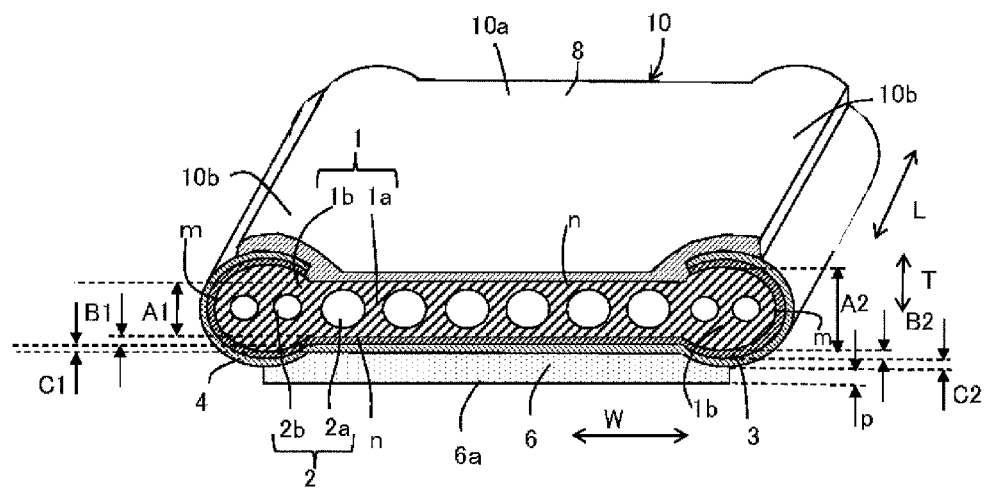
FIGS. 5A and 5B illustrate a third embodiment of the fuel cell.
Figure 5B:
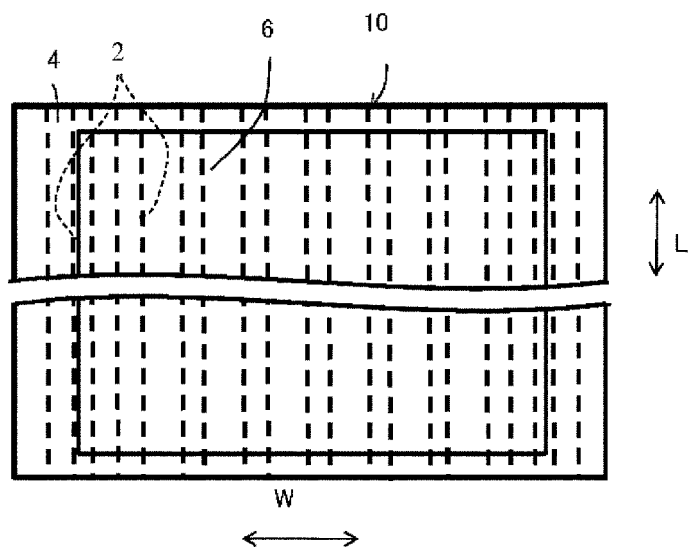

FIGS. 5A and 5B illustrate a third embodiment of the solid oxide fuel cell.

The fuel cell 10 is a hollow plate type fuel cell and is provided with the porous conductive supporting body 1 with an elongated plate shape containing Ni. The embodiment in FIGS. 5A and 5B also has the same amount of Na as the supporting body 1 in FIG. 1.

In the interior of the supporting body 1, a plurality of fuel gas flow paths 2 are formed at appropriate intervals to pass therethrough in the longitudinal direction L of the supporting body 1. That is, the fuel gas flow paths 2 are formed in the interior of the supporting body 1 in the longitudinal direction L perpendicular to the width direction W of the supporting body 1.

The supporting body 1 has a supporting body central portion 1a in the central portion of the supporting body 1 in the width direction W and supporting body end portion 1b provided at each side of the supporting body central portion 1a in the width direction W with shapes bulged in the thickness direction T of the supporting body 1. The fuel cell 10 has a structure in which various layers are provided on the supporting body 1. Due to this, looking at a state in which the oxygen electrode layer 6 is not formed, the fuel cell 10 has a cylindrical shape formed of a cell central section 10a of a central portion in the width direction W and cell ends 10b provided at each side of the cell central section 10a in the width direction W with shapes bulged in the thickness direction T of the cell central section 10a.

The cross-sectional area of the fuel gas flow path 2b in the supporting body end portion 1b of the supporting body 1 is smaller than the cross-sectional area of the fuel gas flow path 2a in the supporting body central portion 1a. Because the leading ends of the supporting body end portion 1b with shapes bulged in the thickness direction T of the supporting body central portion 1a form a curved shape protruding to the outside and stress is concentrated more easily on the supporting body end portion 1b than on the supporting body central portion 1a, the cross-sectional area of the fuel gas flow path 2b in the supporting body end portion 1b is smaller than the cross-sectional area of the fuel gas flow path 2a in the supporting body central portion 1a. Due to this, the strength of the supporting body 1 can be improved at the supporting body end portion 1b and the generation of cracks or the like in the fuel cell 10 reduced.

The cross-sectional area of the fuel gas flow path 2b in the supporting body end portion 1b is, for example, set to 20 to 80% of the cross-sectional area of the fuel gas flow path 2a in the supporting body central portion 1a.

As can be understood from the shape illustrated in FIGS. 5A and 5B, the outer surface shape of the supporting body 1 is configured by a pair of main surfaces parallel to each other and provided on the upper and lower surfaces of the supporting body central portion 1a and arcuate surfaces (side surfaces) m with shapes protruding to the outside provided on the supporting body end portion 1b. Both surfaces of the main surfaces n are formed to be substantially parallel to each other, a porous fuel electrode layer (inner electrode layer) 3 is arranged so as to cover the first main surface n (the lower surface) and the arcuate surfaces m on both sides thereof, and the solid electrolyte layer 4 formed of a dense ceramic having a gas barrier property is also arranged so as to cover the fuel electrode layer 3.

In addition, on the surface of the solid electrolyte layer 4 on the first main surface n, a porous oxygen electrode layer (an outer electrode layer) 6 is arranged so as to face the fuel electrode layer 3. In FIGS. 5A and 5B, illustration of the intermediate layer between the oxygen electrode layer 6 and the solid electrolyte layer 4 is omitted.

The oxygen electrode layer 6 is formed on the first main surface n of the supporting body 1 and is formed from a portion corresponding to the supporting body central portion 1a to parts of the supporting body end portion 1b positioned on each side of the supporting body 1 in the width direction W, and the outer surface of the oxygen electrode layer 6 in the supporting body central portion 1a is positioned further to the outside than the outer surface of the solid electrolyte layer 4 in the supporting body end portion 1b.

In other words, the solid electrolyte layer 4 is provided on the first main surface n in the supporting body central portion 1a and the supporting body end portion 1b, the oxygen electrode layer 6 is provided on the first main surface n in the supporting body central portion 1a, and at least a part of the surface (the surface on the outside) of the oxygen electrode layer 6 is positioned further to the outside than the surface of the solid electrolyte layer 4 at the supporting body end portion 1b. The outer surface of the oxygen electrode layer 6 is set to be a substantially planar surface and the entire surface on the outside of the oxygen electrode layer 6 is set as an outermost surface 6a. A protrusion amount p of the outer surface of the oxygen electrode layer 6 in the supporting body central portion 1a, from the outer surface of the solid electrolyte layer 4, is set to 200 μm or less.

In addition, the dense interconnector layer 8 having a gas barrier property is formed via a cohesion layer, which is not illustrated, on the second main surface n (the upper surface) of the supporting body 1.

The interconnector layer 8 is provided to extend from the second main surface n of the supporting body central portion 1a of the supporting body 1 up to the supporting body end portion 1b. The ends of the interconnector layer 8 in the width direction W are positioned further to the outside than the ends of the oxygen electrode layer 6 in the width direction W.

Then, the fuel electrode layer 3 and the solid electrolyte layer 4 are provided to extend from the first main surface n of the supporting body 1, around the arcuate surfaces m of the supporting body end portion 1b of each end, and up to the second main surface n of the supporting body end portion 1b, and both ends of the interconnector layer 8 are laminated to be bonded with both ends of the solid electrolyte layer 4. The leading ends of the fuel electrode layer 3 and the solid electrolyte layer 4 are positioned on the second main surface n of the supporting body end portion 1b and do not reach the supporting body central portion 1a.

Both ends of the solid electrolyte layer 4 are bonded with both ends of the interconnector layer 8 at the supporting body end portion 1b and the thickness of the interconnector layer 8 of a portion bonded with the solid electrolyte layer 4 is thicker than the thickness of the interconnector layer 8 in the cell central section 10a. Because the interconnector layer 8 and the solid electrolyte layer 4 are bonded at the supporting body end portion 1b bulged in the thickness direction T, in a case of forming the interconnector layer 8 by printing and coating for example, there is a tendency for the interconnector layer 8 to be thinner at the supporting body end portion 1b bulged in the thickness direction T. In addition, greater stress is generated in the solid electrolyte layer 4 and the interconnector layer 8 at the supporting body end portion 1b bulged in the thickness direction T than in the supporting body central portion 1a. Due to this, cracks are generated in the thin interconnector layer 8 in the bonding sections and there is a concern that the fuel gas will leak out.

In contrast, in the present embodiment, since the thickness of the interconnector layer 8 of the portion bonded with the solid electrolyte layer 4 is thicker than the thickness of the interconnector layer 8 in the supporting body central portion 1a, the electrical resistance of the interconnector layer 8 can be reduced in the supporting body central portion 1a, the strength of the interconnector layer 8 itself can be increased at the supporting body end portion 1b, and cracks in the bonding section with the solid electrolyte layer 4 can be reduced. For example, the thickness of the interconnector layer 8 in the supporting body central portion 1a is 30 to 60 μm and the thickness of the interconnector layer 8 in the portion bonded with the solid electrolyte layer 4 is 40 to 80 μm.

As illustrated in FIG. 5B, the planar shape of the oxygen electrode layer 6 is a rectangular shape and is not formed at the upper and lower ends of the supporting body 1, while the interconnector layer 8 is formed from one end in the longitudinal direction L of the supporting body 1 up to the other end as illustrated in FIG. 5B. Here, the solid electrolyte layer 4 is also formed from one end in the longitudinal direction L of the supporting body 1 up to the other end.

In the cell central section 10a of the fuel cell 10, when the thickness of the supporting body central portion 1a of the supporting body 1 is set as A1, the thickness of the fuel electrode layer 3 as B1, and the thickness of the solid electrolyte layer 4 as C1 and, in the cell ends 10b of the fuel cell 10, the thickness of the supporting body end portion 1b is set as A2, the thickness of the fuel electrode layer 3 as B2, and the thickness of the solid electrolyte layer 4 as C2, a relationship of A2+B2+C2>A1+B1+C1 is satisfied in the fuel cell 10. In particular, the value of (A2+B2+C2)/(A1+B1+C1) is from 1.01 to 1.3.

Since the amount of Na in the supporting body 1 in the fuel cell configured as described above is $30 \times 10^{-6}$ mass % or less in the same manner as the embodiment in FIGS. 1A and 1B, even if the firing temperature is lowered, the open porosity can be decreased and the strength of the fuel cell can be increased and the generation of cracks reduced. Furthermore, since the oxygen electrode layer 6 is formed from the supporting body central portion 1a to a part of the supporting body end portion 1b of each side in the width direction W and the outer surface of the oxygen electrode layer 6 in the supporting body central portion 1a is positioned further to the outside than the outer surface of the solid electrolyte layer 4 in the supporting body end portion 1b, the oxygen electrode layer 6 which protrudes further to the outside than the solid electrolyte layer 4 of the supporting body end portion 1b can sufficiently contact another fuel cell 10 via a heat resistant metal and the electrical connection reliability can be improved.

That is, in a dumbbell-shaped fuel cell of the conventional art, when the outer surface of the oxygen electrode layer 6 in the supporting body central portion 1a is recessed further than the solid electrolyte layer 4 of the supporting body end portion 1b of each side in the width direction W and the fuel cell 10 is bonded with another fuel cell 10 via a heat resistant metal for example, there was a concern regarding electrical connection defects since the oxygen electrode layer 6 and the heat resistant metal do not easily come into contact in the supporting body central portion 1a. However, in the present embodiment, since the outer surface of the oxygen electrode layer 6 in the supporting body central portion 1a protrudes further than the solid electrolyte layer 4 of the supporting body end portion 1b, the oxygen electrode layer 6 and the heat resistant metal sufficiently come into contact and the electrical connection reliability can be improved.

Figure 6A:
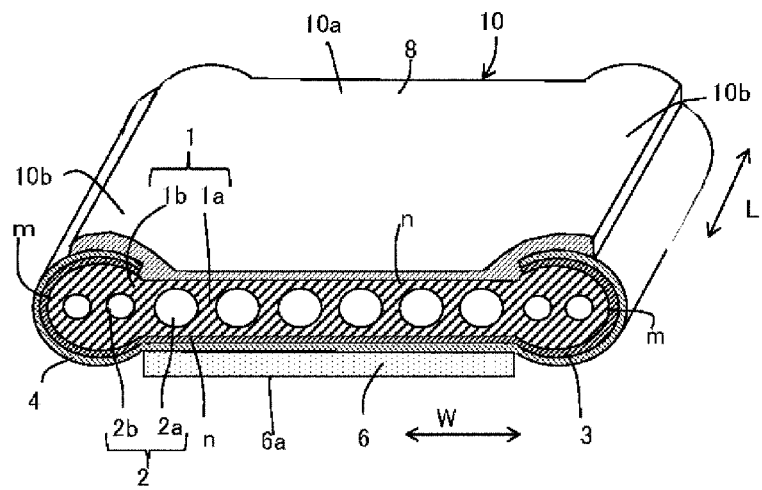
FIGS. 6A and 6B are respectively cross-sectional perspective views of a fourth embodiment and a fifth embodiment of the fuel cell.
Figure 6B:
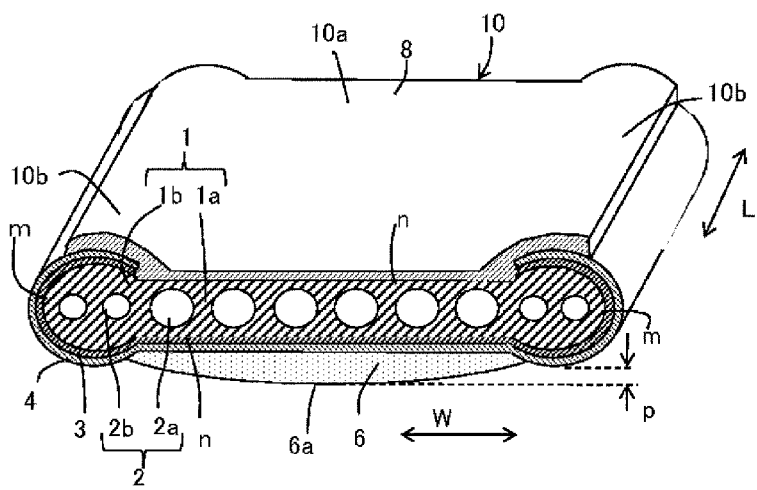

FIGS. 6A and 6B respectively illustrate the fourth embodiment and the fifth embodiment of the fuel cell and, in the fourth embodiment of FIG. 6A, the oxygen electrode layer 6 is only formed in a portion corresponding to the supporting body central portion 1a and is not formed at the supporting body end portion 1b at each side in the width direction W. For this oxygen electrode layer 6, it is possible to laminate a green sheet containing an oxygen electrode material.

In addition, in the fifth embodiment of FIG. 6B, the oxygen electrode layer 6 is formed in a part of the supporting body end portion 1b and the supporting body central portion 1a and the ends of the oxygen electrode layer 6 in the width direction W of the supporting body 1 are gradually thinner toward the end in the width direction W. The oxygen electrode layer 6 can be formed by screen printing.

In FIG. 6B, the surface of the oxygen electrode layer 6 in the supporting body central portion 1a has the outermost surface 6a positioned further to the outside than the surface of the solid electrolyte layer 4 at the supporting body end portion 1b.

Below, description will be given of each member configuring the fuel cells 10 of the first to fifth embodiments described above. Since there is a demand for the conductive supporting body 1 to have gas permeability in order to allow the fuel gas to pass up to the fuel electrode layer 3 and conductivity for collecting current via the interconnector layer 8, for example, the conductive supporting body 1 is formed of a mixture of Ni and/or NiO and inorganic oxides other than NiO, for example, specific rare earth oxides, CSZ (calcia stabilized zirconia), YSZ (8YSZ) (yttria stabilized zirconia), $Y_2O_3$ (yttria), MgO (magnesium oxide), or $MgAl_2O_4$ (magnesia alumina spinel), and MgO (magnesium oxide), and the Na content is $30 \times 10^{-6}$ mass % or less.

The Na content can be measured by the atomic absorption spectroscopy. In addition, the amount of Na in the supporting body 1 can be set to 30 ppm or less by reducing the amount of Na in the supporting body molded body using raw materials or organic components with a low Na content.

The specific rare earth oxides are used in order to bring the thermal expansion coefficient of the supporting body 1 close to the thermal expansion coefficient of the solid electrolyte layer 4, and it is possible to use rare earth oxides including at least one element which is selected from a group formed of Y, Lu, Yb, Tm, Er, Ho, Dy, Gd, Sm, and Pr in combination with N and/or NiO. Specific examples of such rare earth oxides include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$, and $Y_2O_3$ and $Yb_2O_3$ are preferable from the points of view of forming little solid solution with Ni and/or NiO and having almost no reaction with Ni and/or NiO, the thermal expansion coefficient being the same as the solid electrolyte layer 4, and being inexpensive.

In addition, in the present embodiment, from the points of view of maintaining favorable electrical conductivity in the supporting body 1 and bringing the thermal expansion coefficient close to that of the solid electrolyte layer 4, it is preferable that the Ni and/or NiO and the rare earth oxides are present at a volume ratio of 35:65 to 65:35. Here, other metal components or oxide components may be contained in the supporting body 1 in a range in which the required characteristics are not impaired.

In addition, since it is necessary for the supporting body 1 to have fuel gas permeability, the supporting body 1 is porous, the open porosity is normally 25% or more, in particular, 30% or more, and, in consideration of the supporting body strength, 35% or less, and particularly preferably 32% or less. Specifically, the open porosity is desirably from 25 to 35%, from 30 to 35%, and from 30 to 32%. In addition, the conductivity of the supporting body 1 is 300 S/cm or more, and particularly preferably 440 S/cm or more.

In addition, the thickness of the supporting body 1 is desirably 5 mm or less since it is necessary for the supporting body 1 to have fuel gas permeability and desirably 1.5 mm or more from the point of view of support.

Here, the length (the length in the width direction W of the supporting body 1) of the main surface n of the supporting body 1 is, for example, from 15 to 35 mm, the length (the length of the arc) of the arcuate surface m is from 2 to 8 mm, and the length of the supporting body 1 is, for example, from 100 to 300 mm.

The fuel electrode layer 3 generates an electrode reaction and can itself be formed of a known porous conductive ceramic. For example, the fuel electrode layer 3 can be formed from $ZrO_2$ in which rare earth elements are dissolved or $CeO_2$ in which rare earth elements are dissolved, and Ni and/or NiO. Here, the rare earth elements exemplified in the conductive supporting body 1 can be used as the rare earth elements and, for example, it is possible to form the fuel electrode layer 3 from $ZrO_2$ (YSZ) in which Y is dissolved and Ni and/or NiO.

The content of $ZrO_2$ in which rare earth elements are dissolved or of $CeO_2$ in which rare earth elements are dissolved in the fuel electrode layer 3 is preferably in a range of 35 to 65 volume %, and the content of Ni and/or NiO is preferably from 65 to 35 volume %. Furthermore, the open porosity of the fuel electrode layer 3 is 15% or more and particularly preferably in a range of 20 to 40% and the thickness thereof is preferably from 1 to 30 μm.

In addition, since the fuel electrode layer 3 may be formed at a position facing the oxygen electrode layer 6, for example, the fuel electrode layer 3 may be formed only on the first main surface n on the lower side of the supporting body 1 on which the oxygen electrode layer 6 is provided. That is, the fuel cell may have a structure in which the fuel electrode layer 3 is provided only on the first main surface n on the lower side of the supporting body 1 and the solid electrolyte layer 4 is formed on the fuel electrode layer 3 surface, the surfaces of the arcuate surfaces m of the supporting body 1, and the second main surface n on the upper side of the supporting body 1 on which the fuel electrode layer 3 is not formed.

The solid electrolyte layer 4 preferably uses ceramics formed of partially stabilized or stabilized $ZrO_2$ containing from 3 to 15 mol % of rare earth elements such as Y, Sc, and Yb. In addition, Y is preferable as the rare earth element from the point of view of being inexpensive. The solid electrolyte layer 4 is not limited to ceramics formed of partially stabilized or stabilized $ZrO_2$ and may of course be a lanthanum gallate-type solid electrolyte layer known in the conventional art for example.

The intermediate layer 9 is formed between the solid electrolyte layer 4 and the oxygen electrode layer 6 to be described later with the object of strengthening the bonding between the solid electrolyte layer 4 and the oxygen electrode layer 6 and reducing the formation of a reactive layer with high electrical resistance due to a reaction between the components of the solid electrolyte layer 4 and the components of the oxygen electrode layer 6. Here, description of the intermediate layer 9 is omitted in FIGS. 5A to 6B.

The intermediate layer 9 is formed of a $CeO_2$ based sintered body containing rare earth elements other than Ce and, for example, preferably has a composition which is represented by $(CeO_2)_{1-x}(REO_{1.5})_x$ (in the formula, RE is at least one of Sm, Y, Yb, and Gd, and x is a number satisfying $0<x\leq0.3$). Furthermore, from the point of view of reducing the electrical resistance, Sm or Gd are preferably used as RE and, for example, preferably formed of $CeO_2$ in which from 10 to 20 mol % of $SmO_{1.5}$ or $GdO_{1.5}$ is dissolved.

The oxygen electrode layer 6 is preferably formed using a conductive ceramic formed of a so-called $ABO_3$ type perovskite oxide. As the perovskite oxide, at least one type of transition metal perovskite oxide containing La, in particular, $LaMnO_3$ based oxide, $LaFeO_3$ based oxide, and $LaCoO_3$ based oxide, in which Sr and La coexist at the A site, is preferable, and $LaCoO_3$ based oxide is particularly preferable from the point of view of high electrical conductivity at an operating temperature of approximately from 600 to 1000° C. Here, Co may be present along with Fe or Mn at the B site in the perovskite oxide described above.

In addition, it is necessary for the oxygen electrode layer 6 to have gas permeability, accordingly, the conductive ceramic (perovskite oxide) which forms the oxygen electrode layer 6 has an open porosity in a range of 20% or more, and particularly preferably from 30 to 50%. Furthermore, the thickness of the oxygen electrode layer 6 is preferably from 30 to 100 μm from the point of view of the current collecting property.

The interconnector layer 8 is formed of a conductive ceramic. Since the fuel gas (hydrogen-containing gas) and the oxygen-containing gas come into contact, it is necessary to have reduction resistance and oxidation resistance. For this reason, for example, a lanthanum chromite-based perovskite oxide ($LaCrO_3$ based oxide) is used as a conductive ceramic having reduction resistance and oxidation resistance, in particular, a $LaCrMgO_3$ based oxide in which Mg is present at the B site can be used with the object of bringing the thermal expansion coefficients of the supporting body 1 and the solid electrolyte layer 4 closer. The material of the interconnector layer 8 may be a conductive ceramic and is not particularly limited.

In addition, the thickness of the interconnector layer 8 is preferably from 10 to 60 μm from the points of view of gas leakage prevention and electrical resistance. In this range, gas leakage can be prevented and the electrical resistance reduced.

Furthermore, a cohesion layer (not illustrated) can be formed between the supporting body 1 and the interconnector layer 8 in order to reduce the thermal expansion coefficient difference between the interconnector layer 8 and the supporting body 1, or the like.

A composition similar to the fuel electrode layer 3 can be used as the cohesion layer. For example, the cohesion layer can be formed with at least one out of rare earth oxides, $ZrO_2$ in which rare earth elements are dissolved, and $CeO_2$ in which rare earth elements are dissolved, and Ni and/or NiO. More specifically, for example, it is possible to form the cohesion layer with a composition formed of $Y_2O_3$ and N and/or NiO, a composition formed of $ZrO_2$ (YSZ) in which Y is dissolved and N and/or NiO, or a composition formed of $CeO_2$ in which Y, Sm, Gd, or the like is dissolved and N and/or NiO. Here, the rare earth oxides, or the $ZrO_2$ ($CeO_2$) in which the rare earth elements are dissolved and the N and/or NiO are preferably set to a volume ratio in a range of 40:60 to 60:40.

Description will be given of an example of the method for manufacturing the fuel cell 10 described above. First, for example, a clay is prepared by mixing Ni and/or NiO powder, powder of inorganic oxides such as $Y_2O_3$, an organic binder, and a solvent, a supporting body molded body is manufactured by extrusion molding using the clay, and the result is dried. Here, powder with little Na content is used as the Ni and/or NiO powder and the powder of a rare earth oxide such as $Y_2O_3$ and components with little Na content are used as the organic components such as the organic binder and the solvent. Here, a calcined body in which the supporting body molded body is calcined for 2 to 6 hours at from 900 to 1000° C. may be used as the supporting body molded body. As illustrated in FIGS. 5A and 5B, to manufacture the supporting body 1 having the supporting body central portion 1a and the supporting body end portion 1b provided at each side of the supporting body central portion 1a in the width direction W with shapes bulged in the thickness direction T, for example, a supporting body molded body can be manufactured with a desired shape by using a mold (die) with a shape where the end portions are bulged.

Next, for example, the raw materials of NiO and $ZrO_2$ (YSZ) in which $Y_2O_3$ is dissolved are weighed and mixed in accordance with a predetermined formulation composition. After this, a slurry for a fuel electrode layer is prepared by mixing an organic binder and a solvent in the mixed powder.

Then, a slurry formed by adding toluene, a binder powder, a commercially available dispersing agent, and the like to $ZrO_2$ powder in which rare earth elements are dissolved is molded using a doctor blade method or the like to manufacture a sheet-shaped solid electrolyte layer molded body.

A fuel electrode layer molded body is formed by coating and drying the slurry for the fuel electrode layer on the obtained sheet-shaped solid electrolyte layer molded body and a sheet-shaped laminate molded body is formed. The fuel electrode layer molded body side surface of the sheet-shaped laminate molded body on which the fuel electrode layer molded body and the solid electrolyte layer molded body are laminated is laminated on the conductive supporting body molded body, and a molded body is formed.

Next, the laminated molded body described above is calcined for 2 to 6 hours at from 800 to 1200° C. Next, a slurry is manufactured by mixing an interconnector layer material (for example, $LaCrMgO_3$ based oxide powder), an organic binder, and a solvent. The subsequent steps for the method for manufacturing the fuel cell having a cohesion layer will be described.

Next, a cohesion layer molded body positioned between the supporting body 1 and the interconnector layer 8 is formed. For example, $ZrO_2$ in which Y is dissolved is mixed with NiO in a volume ratio in a range of 40:60 to 60:40, the result is dried, and a cohesion layer slurry is prepared by adding an organic binder and the like and coated on the supporting body molded body between both ends of the solid electrolyte layer molded body to form a cohesion layer molded body.

Next, an intermediate layer arranged between the solid electrolyte layer 4 and the oxygen electrode layer 6 is formed. For example, a heat treatment is performed for 2 to 6 hours at from 800 to 900° C. on $CeO_2$ powder in which $GdO_{1.5}$ is dissolved and the raw material powder for the intermediate layer molded body is prepared. Toluene is added as a solvent to this raw material powder, an intermediate layer slurry is produced, and an intermediate layer molded body is produced by coating this slurry on a solid electrolyte layer molded body.

After this, the interconnector layer slurry is coated on the cohesion layer molded body upper surface such that both ends of the interconnector layer molded body are laminated on both ends of the solid electrolyte layer molded body (calcined body), and a laminated molded body is produced. Here, it is also possible to prepare an interconnector layer slurry, produce an interconnector layer sheet, laminate an interconnector layer sheet on the cohesion layer molded body upper surface such that both ends of the interconnector layer sheet are laminated on both ends of the solid electrode layer molded body, and produce a laminate molded body. As illustrated in FIGS. 5A and 5B, a desired thickness can be obtained, for example, by re-coating the interconnector layer slurry on the interconnector molded body of the ends 10b to increase the thickness of the interconnector layer at the ends 10b.

Next, the laminate molded body described above is subjected to a binder removal treatment, and co-sintering (co-firing) is carried out in an oxygen-containing atmosphere for 2 to 6 hours at from 1400 to 1500° C., in particular, at from 1425 to 1475° C.

Furthermore, the fuel cell 10 of the present embodiment with the structure illustrated in FIGS. 1A and 1B can be manufactured by coating a slurry containing a material for an oxygen electrode layer (for example, $LaCoO_3$ based oxide powder), a solvent, and a pore forming agent on an intermediate layer by dipping or the like, and carrying out baking for 2 to 6 hours at from 1000 to 1300° C. As illustrated in FIGS. 5A and 5B, to position the outer surface of the oxygen electrode layer 6 in the supporting body central portion 1a further to the outside than the outer surface of the solid electrolyte layer 4 in the supporting body end portion 1b, for example, the thickness of the oxygen electrode layer molded body is formed by adjusting the slurry coating amount such that the outer surface of the oxygen electrode layer 6 in the supporting body central portion 1a is positioned further to the outside than the outer surface of the solid electrolyte layer 4 in the supporting body end portion 1b after firing.

Figure 7A:
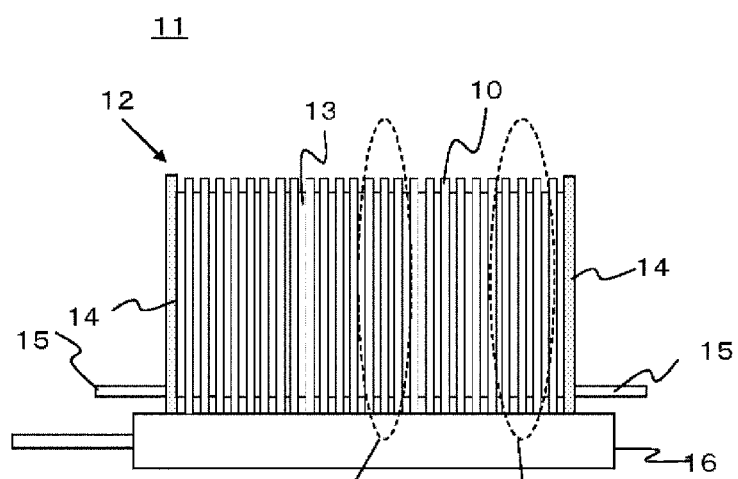
FIGS. 7A and 7B illustrate examples of a cell stack device using the fuel cell in FIGS. 5A and 5B.
Figure 7B:
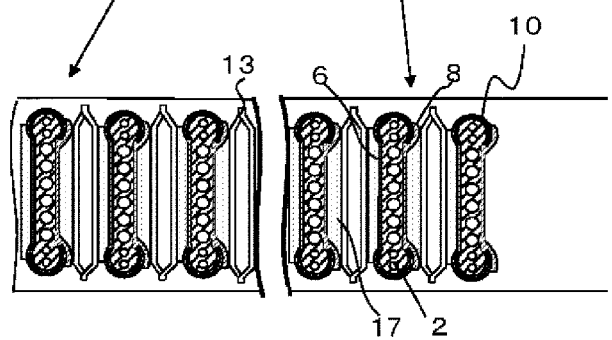

FIGS. 7A and 7B illustrate an example of the cell stack device configured by electrically connecting a plurality of the fuel cells 10 described above in series via current collecting members 13, FIG. 7A is a side surface view schematically illustrating a cell stack device 11 and FIG. 7B is a partially enlarged cross-sectional view of the cell stack device 11 of FIG. 7A and illustrates the extracted portions surrounded by the broken lines illustrated in FIG. 7A. Here, in FIG. 7B, the portions corresponding to the portions surrounded by the broken lines illustrated in FIG. 7A are illustrated with arrows for clarity and, in the fuel cell 10 illustrated in FIG. 7B, some of the members such as the intermediate layer described above are omitted from the illustration.

Here, in the cell stack device 11, a cell stack 12 is configured by arranging each of the fuel cells 10 via the current collecting members 13, the lower ends of each of the fuel cells 10 are fixed using an adhesive such as a glass sealing material to a gas tank 16 for supplying fuel gas to the fuel cells 10. In addition, using elastically deformable conductive members 14 of which the lower ends are fixed to the gas tank 16, the cell stack 12 is pinched from both ends in the arrangement direction of the fuel cells 10.

In addition, the conductive members 14 are provided with current lead out sections 15 for leading out current generated by the power generation of the cell stack 12 (the fuel cells 10) with a shape extending in the arrangement direction of the fuel cells 10 toward the outside.

Figure 8:
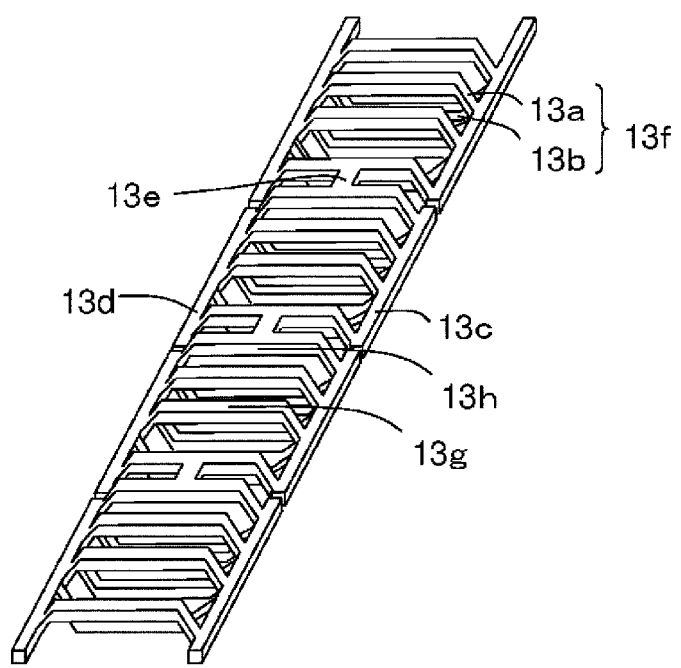
FIG. 8 is a perspective view illustrating a current collecting member in FIG. 7B.

In FIG. 7B, two of the fuel cells 10 are electrically connected by the current collecting member 13 and, as illustrated in FIG. 8, for example, the current collecting member 13 is configured by forming slits extending in the width direction at predetermined intervals in the longitudinal direction in a heat resistant alloy plate with a rectangular shape and making the strip sections between the slits alternately protrude in the thickness direction of the heat resistant alloy plate, and the cell stack 12 is configured by bonding the strip sections protruding in the opposing direction to each of the fuel cells 10 using a conductive adhesive.

That is, in the current collecting member 13, a plurality of first current collecting pieces 13a to be bonded with the first fuel cell 10, a plurality of second current collecting pieces 13b to be bonded with the second fuel cell 10 adjacent to the first fuel cell, a first linking section 13c linking the ends at one side of the plurality of first current collecting pieces 13a and the plurality of second current collecting pieces 13b, and a second linking section 13d linking the other ends of the plurality of first current collecting pieces 13a and the plurality of second current collecting pieces 13b, are set as one unit, and the current collecting member 13 is configured by linking a set of a plurality of these units using conductive linking pieces 13e in the longitudinal direction of the fuel cells 10. The first collecting piece 13a and the second collecting piece 13b indicate portions bonded with the fuel cells 10 and these portions are current collecting sections 13f which extract electrical current using the fuel cells 10. In addition, a space between the first current collecting piece 13a and the second current collecting piece 13b is set as a space through which oxygen-containing gas flows.

Then, the interconnector layer 8 of the fuel cell 10 is recessed between the ends 10b; however, for example, a p-type semiconductor formed of an oxygen electrode material, a conductive adhesive, or a planarizing layer 17 formed of a p-type semiconductor and a conductive adhesive is arranged between the recessed portion and the current collecting member 13. In other words, the planarization is carried out by arranging the p-type semiconductor and the adhesive on the interconnector layer 8 between the supporting body end portion 1b, the outer surface of the planarizing layer 17 is positioned to be further outside than, or on the same plane as, the outer surface of the solid electrolyte layer 4 formed on the ends 1b, and the current collecting member 13 is bonded with the planarizing layer 17.

In such a cell stack device, the outer surface of the planarizing layer 17 of the p-type semiconductor and the adhesive arranged on the oxygen electrode layer 6 and the interconnector layer 8 protrudes to the outside and reliably comes into contact with the current collecting member 13, the strength of the bond between the fuel cells 10 is improved, and the electrical connection reliability can be improved.

Figure 9:
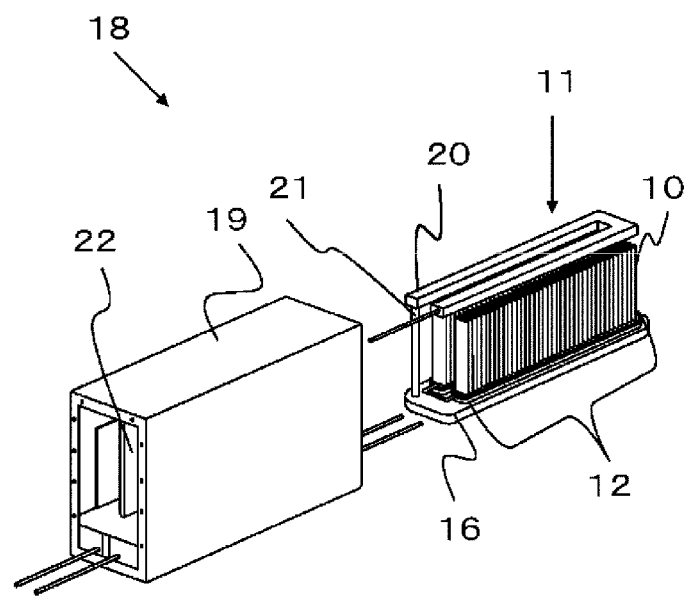
FIG. 9 is an external perspective view illustrating an example of a fuel cell module.

FIG. 9 is an external perspective view illustrating an example of a fuel cell module 18 in which the cell stack device 11 is housed in a housing container 19 and the cell stack device 11 illustrated in FIGS. 7A and 7B is configured to be housed in the rectangular housing container 19.

Here, in order to obtain the fuel gas to be used in the fuel cell 10, a reformer 20 for generating fuel gas by reforming raw materials such as natural gas and kerosene is arranged above the cell stack 12. Then, the fuel gas generated in the reformer 20 is supplied to the gas tank 16 via a gas flow pipe 21 and supplied to the fuel gas flow path 2 provided in the fuel cell 10 via the gas tank 16.

Here, FIG. 9 illustrates a state in which a part (the front and rear surfaces) of the housing container 19 is detached and the cell stack device 11 and the reformer 20 housed in the interior are taken out to the rear. In the fuel cell module 18 illustrated in FIG. 9, the cell stack device 11 can be housed in the housing container 19 by being slid therein. Here, the cell stack device 11 may include the reformer 20.

In addition, in FIG. 9, an oxygen-containing gas introducing member 22 provided in the housing container 19 is arranged between a pair of cell stacks 12 lined up in the gas tank 16 and oxygen-containing gas is supplied to the lower ends of the fuel cells 10 such that the flow of the oxygen-containing gas is synchronized with the flow of the fuel gas so as to flow at the sides of the fuel cell 10 from the lower ends toward the upper ends. Then, by reacting the fuel gas discharged from the fuel gas flow path 2 of the fuel cell 10 with the oxygen-containing gas to be burned at the upper end side of the fuel cell 10, the temperature of the fuel cell 10 can be increased and the activation of the cell stack device 11 sped up. In addition, the reformer 20 arranged above the fuel cell 10 (the cell stack 12) can be heated by burning the fuel gas and the oxygen-containing gas discharged from the gas flow path 2 of the fuel cell 10 on the upper end side of the fuel cell 10. Due to this, a reforming reaction can be efficiently performed in the reformer 20.

Furthermore, because the cell stack device 11 using the fuel cell 10 described above is housed in the housing container 19 in the fuel cell module 18 of the present embodiment, a fuel cell module 18 with improved power generation performance and improved long-term reliability can be obtained.

Figure 10:
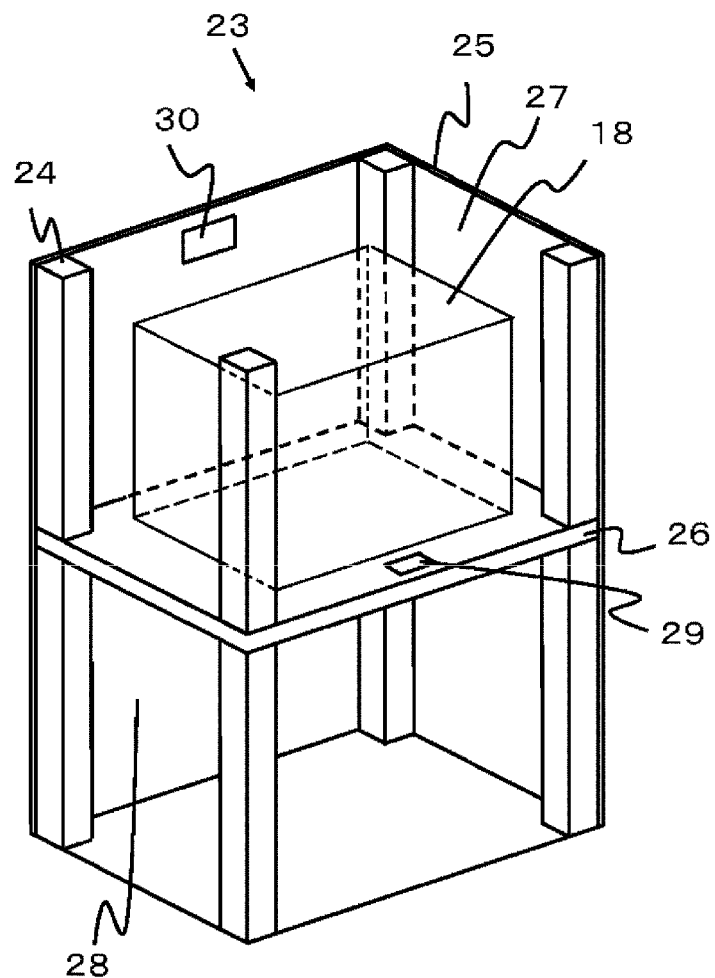
FIG. 10 is a perspective view illustrating a fuel cell device with a part omitted.

FIG. 10 is a perspective view illustrating an example of a fuel cell device (a module-containing device) in which the fuel cell module 18 illustrated in FIG. 9 and an auxiliary device for operating the cell stack device 11 are housed in an external case. Note that some of the components of the configuration are not illustrated in FIG. 10.

In the fuel cell device 23 illustrated in FIG. 10, an outer casing formed of struts 24 and outer plates 25 is divided into an upper and a lower region using a divider 26. The upper region forms a module housing chamber 27 for housing the fuel cell module 18. The lower region forms an auxiliary device housing chamber 28 for housing the auxiliary device for operating the fuel cell module 18. Note that the auxiliary device housed in the auxiliary device housing chamber 28 is not illustrated.

Furthermore, an airflow hole 29 for allowing air in the auxiliary device housing chamber 28 to flow into the module housing chamber 27 is formed in the divider 26, and an exhaust hole 30 for exhausting air out of the module housing chamber 27 is formed in one of the outer plates 25 of the module housing chamber 27.

In the fuel cell device 23, as described above, by configuring the fuel cell module 18 for which the power generation performance is increased and the reliability can be improved to be housed in the module housing chamber 27, it is possible to obtain the fuel cell device 23 with improved reliability.

The invention is not limited to the above-described embodiment, and various modifications, improvements and the like may be made to the embodiment without departing from the scope of the invention. For example, description was given of a hollow, flat solid oxide fuel cell in the embodiment described above; however, naturally, the solid oxide type fuel cell may be a cylindrical type or a flat type. In addition, the fuel cell may be a so-called horizontal-stripe fuel cell. Furthermore, various intermediate layers may be formed between each of the members in accordance with the functions. In addition, for example, the fuel cell may be a fuel cell in which the oxygen electrode layer, the solid electrode layer, and the fuel electrode layer are arranged on the conductive supporting body.

Furthermore, in the embodiment described above, description was given of the solid oxide fuel cell (SOFC), the cell stack device, and the fuel cell module, and a fuel cell device; however, the present invention is not limited thereto and application is also possible to an electrolytic cell (SOEC) which generates hydrogen and oxygen ($O_2$) by electrolyzing water vapor (water) by applying water vapor and voltage in an electrolytic cell and to an electrolytic module and an electrolytic device provided with this electrolytic cell.

EXAMPLES

First, a conductive supporting body molded body was manufactured by mixing NiO powder having an average particle size of 0.5 μm and $Y_2O_3$ powder having an average particle size of 0.9 μm, forming clay prepared in a solvent with an organic binder using an extrusion forming method, and then drying and degreasing the result. In the supporting body molded body, the volume ratio of NiO was 48 volume % and $Y_2O_3$ was 52 volume %. In addition, almost no Na was contained in the NiO powder and the $Y_2O_3$ powder and the organic binder and solvent contained a predetermined amount of Na. The amount of Na in the supporting body molded body was adjusted using an organic binder and a solvent with different Na contents.

Next, a solid electrolyte layer sheet was manufactured using a doctor blade method using a slurry obtained by mixing an organic binder and a solvent in $ZrO_2$ powder (solid electrolyte layer raw material powder) in which 8 mol % of $Y_2O_3$ was dissolved and with a particle diameter of 0.8 μm according to a micro-track method.

A composite oxide including 90 mol % of $CeO_2$ and 10 mol % of oxides of rare earth elements ($GdO_{1.5}$, $SmO_{1.5}$) was pulverized with a vibration mill or ball mill using isopropyl alcohol (IPA) as a solvent, a calcination treatment was performed for four hours at 900° C., a crushing treatment was carried out again in the ball mill, the degree of aggregation of the ceramic particles was adjusted, a binder and a solvent were added to this powder and the result was mixed to produce the slurry for forming the intermediate layer molded body.

Next, a fuel electrode layer slurry, in which NiO powder with an average particle size of 0.5 μm, $ZrO_2$ powder in which $Y_2O_3$ was dissolved, an organic binder, and a solvent were mixed, was produced and then coated and dried on a solid electrolyte layer sheet using a screen printing method to form a fuel electrode layer molded body.

A sheet-shaped laminated molded body in which a fuel electrode layer molded body is formed on the solid electrolyte layer sheet was laminated at a predetermined position on the supporting body molded body with the surface of the fuel electrode layer molded body side on the inside.

Next, the laminated molded body in which the formed bodies described above were laminated was subjected to a calcination process for 3 hours at 1000° C. After this, an intermediate layer molded body was formed by coating and drying a slurry for forming an intermediate layer molded body on the upper surface of a solid electrolyte calcined body using a screen printing method.

Next, an interconnector layer slurry was produced in which La $(Mg_{0.3}Cr_{0.7})_{0.96}O_3$ with an average particle diameter of 0.7 μm, an organic binder, and a solvent were mixed.

Raw materials formed of Ni and YSZ were mixed and dried and the cohesion layer slurry was adjusted by mixing an organic binder and solvent. The adjusted cohesion layer slurry was coated on a portion (a portion where the supporting body is exposed) where the fuel electrode layer of the supporting body (and the solid electrolyte layer) was not formed to laminate a cohesion layer molded body, and the interconnector layer slurry was coated on the cohesion layer molded body.

Next, the laminated molded body described above was subjected to a binder removal treatment and co-fired for two hours at the temperatures illustrated in Table 1 in the atmosphere.

Next, a mixed solution formed of $La_{0.6}Sr_{0.4}Co_{0.2}Fe_{0.8}O_3$ powder with an average particle diameter of 2 μm and isopropyl alcohol was produced, sprayed and coated on the surface of the intermediate layer on the upper surface of the solid electrolyte, an oxygen electrode layer molded body was formed, baking was carried out for 4 hours at 1100° C., an oxygen electrode layer was formed, and the fuel cell illustrated in FIGS. 1A and 1B was manufactured.

Here, the dimensions of the manufactured fuel cell were 25 mm×200 mm, the thickness of the supporting body (the thickness between the main surfaces n) was 2 mm, the thickness of the fuel electrode layer was 10 μm, the thickness of the solid electrolyte layer was 20 μm, and the thickness of the interconnector layer was 40 μm.

As illustrated in FIGS. 7A and 7B, the lower end of the cell stack to which seven of the manufactured fuel cells 10 were electrically connected via a current collecting member was inserted in the opening section of the gas tank, bonded and fixed using an adhesive formed of crystallized glass, and a cell stack device was manufactured.

Hydrogen gas was supplied to the interior of the gas tanks of these cell stack devices, the hydrogen gas flowed in the fuel cell, a reduction process was carried out on the supporting body and the fuel electrode layer for 10 hours at 850° C. and cooling was carried out.

Then, the amount of Na in the supporting body was measured using the atomic absorption spectroscopy and recorded in Table 1. In addition, the open porosity of the supporting body was determined using the Archimedes method and recorded in Table 1. Furthermore, the presence or absence of the generation of cracks in the fuel cell was visually confirmed and appended to Table 1.

TABLE 1

| Sample No. | Firing Temperature ° C. | Supporting Body Na content ×10$^{-6}$ mass % | Open Porosity % | Cell Cracks Present or Absent |
|---|---|---|---|---|
| 1 | 1500 | 11 | 30.24 | Absent |
| 2 | 1500 | 15 | 30.59 | Absent |
| 3 | 1500 | 27 | 31.59 | Absent |
| 4 | 1500 | 30 | 31.99 | Absent |
| *5 | 1500 | 47 | 32.49 | Present |
| *6 | 1500 | 52 | 32.69 | Present |
| *7 | 1500 | 66 | 33.15 | Present |
| *8 | 1500 | 72 | 33.25 | Present |
| 9 | 1520 | 30 | 30.05 | Absent |

*indicates a sample of a comparative example.

From samples No. 1 to 4 in Table 1, it was understood that, even in a case of firing at a low temperature of 1500° C., when the amount of Na in the supporting body is set to 30×10$^{-6}$ mass %, the open porosity can be reduced to 32% or less, the open porosity can be reduced even if the firing temperature is decreased, the strength of the supporting body can be increased, and the generation of cracks in the cell reduced. On the other hand, from samples No. 5 to 8, it was understood that, in a case where the amount of Na in the supporting body was great at from 47 to 72×10$^{-6}$ mass %, the open porosity was more than 32% in a case of being fired at a low temperature of 1500° C., the strength of the supporting body was lowered, and cracks were generated in the fuel cell.

REFERENCE SIGNS LIST

1: Supporting body
1$a$: Supporting body central portion
1$b$: Supporting body end portion
2: Fuel gas flow path
3: Fuel electrode layer (first electrode layer)
4: Solid electrolyte layer
6: Oxygen electrode layer (second electrode layer)
8: Interconnector layer
10: Fuel cell
10$a$: Cell central section
10$b$: Cell end
11: Cell stack device
18: Fuel cell module
23: Fuel cell device

The invention claimed is:

1. A solid oxide fuel cell comprising:
a porous supporting body comprises at least one gas flow path;
a first electrode layer located on the porous supporting body;
a solid electrolyte layer formed of a ceramic and located on the first electrode layer; and
a second electrode located on the solid electrolyte layer,
wherein the porous supporting body comprises an inorganic oxide, Na, and at least one of Ni and NiO,
wherein the inorganic oxide including at least one of:
CSZ,
MgO,
MgAl$_2$O$_4$, and
a specific rare earth oxide selected from Y$_2$O$_3$, Lu$_2$O$_3$, Yb$_2$O$_3$, Tm$_2$O$_3$, Er$_2$O$_3$, Ho$_2$O$_3$, Dy$_2$O$_3$, Gd$_2$O$_3$, Sm$_2$O$_3$ and Pr$_2$O$_3$,
wherein the first electrode layer comprises YSZ and at least one of Ni and NiO,
wherein the porous supporting body has a pre-loaded amount of Na and the pre-loaded amount of Na in the porous supporting body is 30×10(−6) mass % or less.

2. The solid oxide fuel cell according to claim 1, wherein the porous supporting body has an open porosity of 30% or more.

3. The solid oxide fuel cell according to claim 1, wherein the porous supporting body has an elongated plate shape and a thickness thereof is 5 mm or less.

4. The solid oxide fuel cell according to claim 3, wherein the first electrode layer, the solid electrolyte layer, and the second electrode layer are arranged on a first main surface of the porous supporting body, and a interconnector layer is arranged on a second main surface opposing the first main surface, and the at least one gas flow path extending in a longitudinal direction of the porous supporting body.

5. The solid oxide fuel cell according to claim 3, wherein the solid electrolyte layer and the second electrode layer are arranged on a first main surface of the porous supporting body and a interconnector layer is arranged on a second main surface opposing the first main surface, and the at least one gas flow path extending in a longitudinal direction of the porous supporting body.

6. The solid oxide fuel cell according to claim 4, wherein the interconnector layer is formed of a lanthanum chromite-based material.

7. The solid oxide fuel cell according to claim 3, wherein the porous supporting body comprises a supporting body central portion which is provided in a central portion in a width direction of the porous supporting body, and a supporting body end portion, which is provided at each side in the width direction of the supporting body central portion with a shape bulged in a thickness direction of the supporting body central portion.

8. The solid oxide fuel cell according to claim 7, wherein the solid electrolyte layer is provided on the first main surface of the porous supporting body in the supporting body central portion and the supporting body end portion, the second electrode layer is provided on the first main surface in the supporting body central portion, and at least a part of a surface of the second electrode layer is positioned further to the outside than a surface of the solid electrolyte layer at the supporting body end portion.

9. The solid oxide fuel cell according to claim 7, wherein the supporting body central portion and the supporting body end portion each comprise a gas flow path, and a cross-sectional area of the gas flow path in the supporting body end portion is smaller than a cross-sectional area of the gas flow path in the supporting body central portion.

10. A cell stack device comprising: a plurality of the solid oxide fuel cells according to claim 1, the plurality of cells being electrically connected.

11. A module comprising:
the cell stack device according to claim 10; and
a housing container, the cell stack device being housed in the housing container.

12. A module-containing device comprising:
the module according to claim 11; and
an auxiliary device for operating the module,
the module and the auxiliary device being housed in an external case of the module-containing device.

* * * * *